Aug. 9, 1960 F. M. BROCK 2,948,862

BALANCED MODULATOR CIRCUIT

Filed Sept. 8, 1955

INVENTOR.
FRANK M. BROCK
BY
ATTORNEY

United States Patent Office 2,948,862

Patented Aug. 9, 1960

2,948,862

BALANCED MODULATOR CIRCUIT

Frank M. Brock, Haddonfield, N.J., assignor to Radio Corporation of America, a corporation of Delaware Filed Sept. 8, 1955, Ser. No. 533,092

9 Claims. (Cl. 332—47)

This invention relates to balanced modulator circuits, and more particularly to modulators of the balanced shunt type, using rectifiers.

In rectifier modulators of the balanced shunt type, the leakage of the carrier frequency from the carrier input branch to the sideband output branch is a function of the balance obtained among the four diode rectifiers comprising the modulator. The original unbalance in the modulator circuit may come about by reason of aging or temperature effects on the impedances of any or all of the diodes used in the modulator. This "leakage" of carrier frequency energy into the load (the sideband output branch of the modulator) is undesirable, particularly in communications systems of the amplitude-modulation, single or double sideband, suppressed-carrier type, wherein the transmitted local carrier must be highly suppressed relative to the transmitted sideband or sidebands, and so maintained for long periods of time.

An object of this invention is to devise an arrangement for automatically correcting the unbalance of a balanced shunt type modulator, so as to substantially eliminate carrier leakage in the modulator.

Another object is to devise a servo system which operates to constantly adjust the balance in a balanced shunt type modulator, so as to reduce the carrier leakage.

The objects of this invention are accomplished, briefly, in the following manner: The D.C. component of the carrier leakage is proportional to the fundamental A.C. component of leakage, and this D.C. component is sensed and applied to a differential D.C. amplifier for amplification therein. A pair of voltage-sensitive impedances are coupled as a load between the tube anodes of the differential amplifier, in such a way that D.C. biasing of these impedances is produced depending on the magnitude and sense of the D.C. component of the carrier leakage. This causes the A.C. impedances of the two halves of the amplifier load to be unequal, and this impedance unbalance is applied across the manual balance potentiometer of the modulator circuit in the proper sense to tend to correct the original impedance unbalance in the modulator circuit, reducing the A.C. carrier leakage and hence also the D.C. leakage component.

A more detailed description of the invention follows, with reference to the accompanying drawing, wherein.

Figures 1, 2:
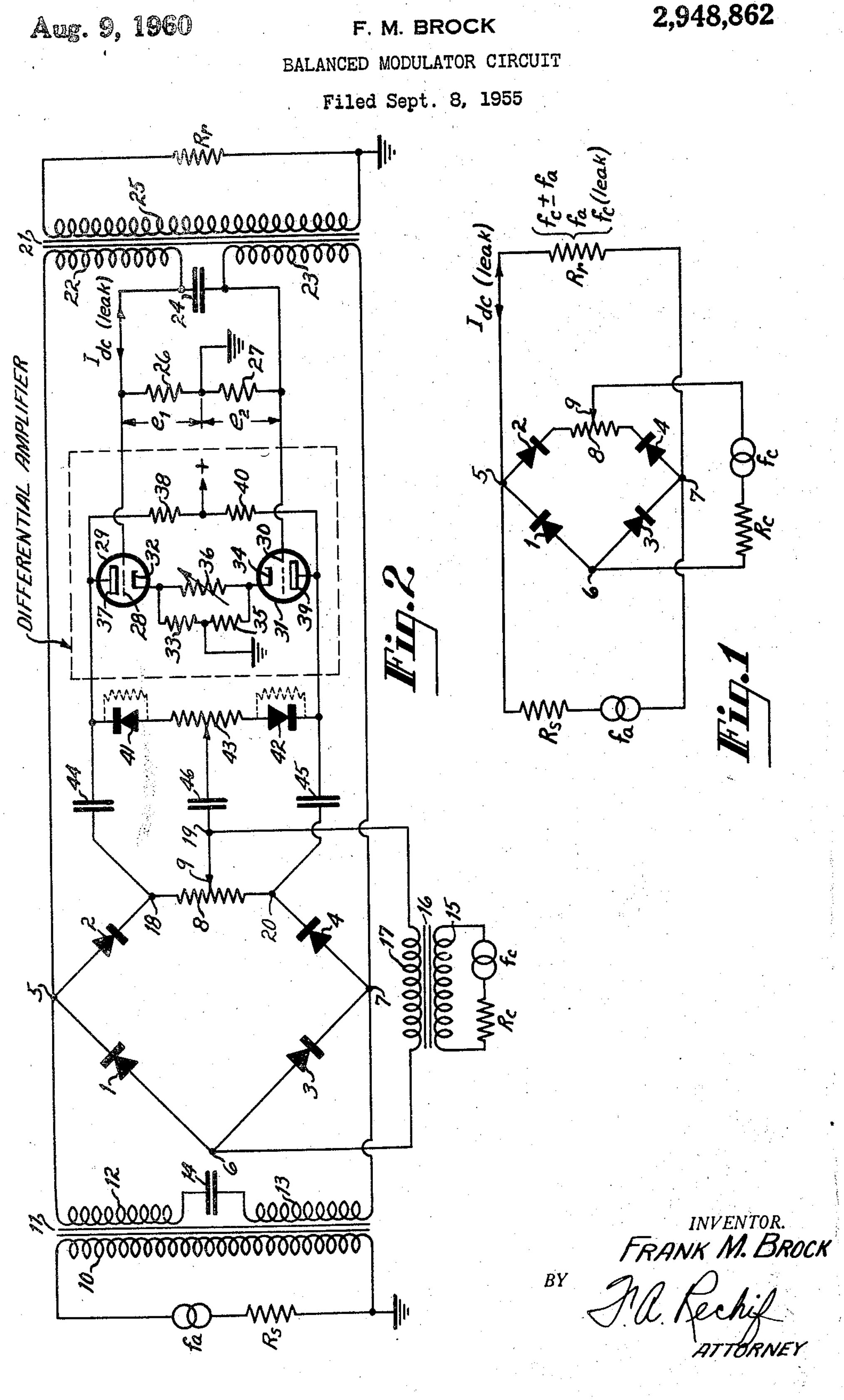
Fig. 1 is a circuit diagram of a basic shunt modulator.
Fig. 2 is a circuit diagram of an arrangement according to the invention.

First referring to Fig. 1, four diodes 1, 2, 3 and 4 are connected as a balanced shunt type rectifier modulator fed by a source $f_a$ of modulating energy and by a source $f_c$ of carrier energy. Diodes 1, 2, 3 and 4 are arranged in the form of a quadrilateral. Diodes 1 and 2 are directly connected together at a first corner 5, diodes 1 and 3 are directly connected together at a second corner 6, diodes 3 and 4 are directly connected together at a third corner 7, and to complete the quadrilateral the opposite ends of a potentiometer 8 are connected to respective diodes 2 and 4. The purpose of potentiometer 8 will be explained later. The movable arm 9 of potentiometer 8 can be considered to be the fourth corner of the quadrilateral.

The source $f_a$ of modulating energy is connected between one pair of opposite corners 5 and 7 of the quadrilateral, through a resistor $R_s$ which represents the resistance of this source. The source $f_c$ of carrier energy is connected between the other pair of opposite corners 6 and 9 of the quadrilateral, through a resistor $R_c$ which represents the resistance of this source. The load, represented by a resistor $R_r$, is connected between the opposite corners 5 and 7. With the connections indicated and with sources $f_a$ and $f_c$ energized, the upper and lower sideband frequencies of first order modulation, $f_c+f_a$ and $f_c-f_a$, appear in load $R_r$, as well as the modulating frequency $f_a$.

It is well known in the art that in rectifier modulators of the balanced shunt type, when there is perfect balance no carrier frequency $f_c$ appears in the load $R_r$. Also, the leakage (denoted by $f_{c(leak)}$) of the carrier frequency from the carrier branch $f_c$, $R_c$ to the sideband output branch $R_r$ is a function of the balance obtained among the diode rectifiers 1–4 comprising the modulator.

With the assumption that the "backward" resistance of the diodes 1–4 is so high that it contributes nothing to the leakage, that is, that the backward resistance is much greater than the load resistance $R_r$, which is in turn greater than the "forward" resistance of the diodes (which assumption can be made true in practice), the D.C. component of the carrier leakage (denoted by $I_{dc(leak)}$) is directly proportional to the fundamental component of the A.C. leakage. In other words, the D.C. component of the fundamental carrier leak frequency in the load is directly proportional to the degree of impedance unbalance among the modulator diodes, both in magnitude and sense. The relationship above stated, of D.C. load voltage to A.C. carrier leakage in balanced shunt rectifier modulators, is simply a function of half-wave rectification in the diode network.

In theory, the connection of a manual balance potentiometer 8 will, on the assumption of a constant forward resistance over the range of applied voltage and a high backward resistance, provide for complete balance in the shunt modulator. However, this does not apply to real rectifiers, due to such things as aging effects on the diodes 1–4, or the effects of temperature on the impedances of any or all of the diodes used in the modulator. The magnitude and sense of the D.C. component of the carrier leakage carries the information necessary to correct the balance conditions among the four diodes; according to this invention this D.C. component is used to correct the original impedance unbalance among the four diodes.

Now referring to Fig. 2, which is a schematic diagram of a practical circuit arrangement according to this invention, the source $f_a$ of modulating energy is connected across the primary winding 10 of a transformer 11, through the source resistance $R_s$, one end of winding 10 being grounded. The secondary of transformer 11 is split into two windings 12 and 13 adjacent ends of which are coupled through a capacitor 14 which has negligible reactance at frequencies $f_a$ and $f_c$ in comparison with circuit impedances $R_s$ and $R_r$ (the latter being the load impedance, as in Fig. 1). The other end of winding 12 is connected to corner 5 of the diode quadrilateral, while the other end of winding 13 is connected to corner 7 of the quadrilateral. Thus, the modulating energy is supplied between corners 5 and 7, as in Fig. 1.

The source $f_c$ of carrier energy is connected across the primary winding 15 of a transformer 16, through the source resistance $R_c$. One end of the secondary winding 17 of transformer 16 is connected to corner 6 of the diode quadrilateral, while the other end of this winding is connected to corner 9 thereof (corner 9 being the movable arm of the manual balance potentiometer 8, as in Fig. 1). Thus, the carrier energy is supplied between corners 6 and 9, as in Fig. 1. Point 18 is located at the common junction of diode 2 and potentiometer 8, point 19 is located at the movable arm 9 of potentiometer 8, while point 20 is located at the common junction of diode 4 and potentiometer 8.

The primary of a transformer 21 is split into two windings 22 and 23 adjacent ends of which are coupled through a capacitor 24 which has negligible reactance at frequencies $f_a$ and $f_c$ in comparison with circuit impedances $R_s$ and $R_r$. The other end of winding 22 is connected to corner 5 of the diode quadrilateral, while the other end of winding 23 is connected to corner 7 of this same quadrilateral. The load impedance $R_r$ is connected across the secondary winding 25 of transformer 21, one end of winding 25 being grounded. Thus, the load $R_r$ is connected in effect between corners 5 and 7, as in Fig. 1.

Two resistors 26 and 27 of equal value are connected in series across capacitor 24, the common junction of these resistors being grounded. The D.C. component of carrier leakage $I_{dc(leak)}$ is blocked from the input transformer 11 winding and from the output transformer 21 winding by capacitors 14 and 24, so that all of $I_{dc(leak)}$ flows in resistors 26 and 27 and produces voltage drops thereacross of $e_1$ and $e_2$, respectively. With respect to the midpoint (ground) of resistors 26 and 27, voltages $e_1$ and $e_2$ are equal in magnitude, but opposite in sign.

Voltage $e_1$ is applied to the grid 28 of a triode vacuum tube 29, while voltage $e_2$ is applied to the grid 30 of a triode vacuum tube 31. The tubes 29 and 31 are connected to function as a symmetrical D.C. differential amplifier. Cathode 32 of tube 29 is connected to ground by way of a resistor 33, while cathode 34 of tube 31 is connected to ground by way of a resistor 35. Cathodes 32 and 34 are connected together through a resistor 36 which is made adjustable for purposes of matching the tubes 29 and 31. The anode 37 of tube 29 is supplied with positive anode potential through a resistor 38, while the anode 39 of tube 31 is supplied with positive anode potential through a resistor 40.

The load between the anodes 37 and 39 of the differential D.C. amplifier comprises two voltage-sensitive impedance devices 41 and 42 (here illustrated as diodes, and which can be germanium or silicon diodes) and a potentiometer 43, the potentiometer 43 being positioned between the two diodes 41 and 42, and like electrodes of diodes 41 and 42 being connected to the respective anodes 37 and 39. The same electrode of impedance device 41 that is connected to anode 37, is coupled through a capacitor 44 to point 18. The same electrode of impedance device 42 that is connected to anode 39, is coupled through a capacitor 45 to point 20. The movable arm of potentiometer 43 is coupled through a capacitor 46 to point 19. The reactances of capacitors 44, 45 and 46 at frequency $f_c$ are negligible compared to the impedance of potentiometers 8 and 43 and diodes 41 and 42. The devices 41 and 42 are so coupled across the manual modulator balance potentiometer 8 by capacitors 44—46 that the impedances of diodes 41 and 42 will provide an auxiliary automatic control of the balance among the modulator diodes 1–4.

Assuming that a D.C. component $I_{dc(leak)}$ of carrier leakage does exist in the windings of transformer 21 due to a given amount of impedance unbalance in the diode modulator circuit, this D.C. will produce voltage drops $e_1$ and $e_2$ across resistors 26 and 27 of equal magnitude but of opposite sign. This difference in grid potentials $e_1$ and $e_2$ is suitably amplified in the D.C. differential amplifier comprising tubes 29 and 31. The potentials of anodes 37 and 39 with respect to ground will not be equal, because of the difference in grid potentials. Then, a direct current will flow through elements 41, 43 and 42, the direction and magnitude of which current will depend on the difference of these anode potentials, and on their relative polarity. Thus, a D.C. biasing of impedances 41 and 42 is effected, and since these are voltage-sensitive impedance devices the A.C. impedance (between points 18 and 19) of one-half of the amplifier load will not balance the A.C. impedance (between points 19 and 20) of the other half. This artificially created impedance unbalance is applied in such a sense across the manual balance potentiometer 8 in the modulator circuit, as to correct the original impedance unbalance in the modulator circuit, reducing the A.C. carrier leakage, and hence also the D.C. leak component.

Thus, it may be seen that the system of this invention acts as a true error-reducing servo feedback system which constantly adjusts the impedance balance in the modulator circuit to achieve minimum D.C. leak component (and hence minimum fundamental A.C. leak).

Idealized conditions (e.g., diode impedance a step-function of impressed carrier voltage, etc.) are never completely realized in practice, so that zero D.C. voltage in the load $R_r$ will not correspond exactly to zero fundamental A.C. carrier leak voltage. However, for every modulator diode configuration there will be some one value of D.C. load voltage which will represent zero fundamental A.C. carrier leak, and the differential D.C. amplifier described can easily be adjusted (by means of potentiometer 43, which allows for zero correction of the differential amplifier) to use this one value as an "artificial control zero," in operating to minimize modulator unbalance. The potentiometer 43 also permits adjustment for slight differences in the characteristics of impedances 41 and 42.

What is claimed is:

1. A balanced modulator circuit comprising a rectifier modulator of the balanced shunt type, means for applying modulation frequency energy to said modulator, means for applying carrier frequency energy to said modulator, means coupling an output circuit to said modulator whereby said modulator is normally balanced with respect to said carrier frequency energy, said last named means having means to provide a direct current component of carrier leakage, and means responsive to said direct current component of carrier frequency leakage appearing present in said output circuit for returning said modulator substantially to its normally balanced condition, thereby to reduce the amplitude of said direct current components.

2. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that said modulator is normally balanced with respect to said carrier frequency energy, means for isolating direct current components present in said output circuit to develop a unidirectional voltage, and means for utilizing said unidirectional voltage to vary the balance of said modulator, thereby to vary also the amplitude of said direct current components.

3. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that said modulator is normally balanced with respect to said carrier frequency energy, means for isolating direct current components present in said output circuit to develop a unidirectional voltage the sense and magnitude of which correspond to the sense and degree of unbalance of said modulator, and means for utilizing said unidirectional voltage to substantially eliminate the modulator unbalance.

4. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit to develop a unidirectional voltage, a voltage-sensitive impedance element coupled to said modulator to affect the impedance balance thereof, and means for applying said unidirectional voltage to said impedance element to control the impedance thereof.

5. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit to develop a unidirectional voltage the sense and magnitude of which correspond to the sense and degree of unbalance of said modulator, a voltage-sensitive impedance element coupled to said modulator to affect the impedance balance thereof, and means for applying said unidirectional voltage to said impedance element to control the impedance thereof in such a direction as to return the modulator substantially to its normally balanced condition.

6. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit and for developing therefrom a pair of unidirectional voltages of opposite relative polarities, two voltage-sensitive impedance elements coupled to said modulator to affect the impedance balance thereof, and means for applying said unidirectional voltages one to each of said impedance elements to control the impedances thereof oppositely.

7. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit and for developing therefrom a pair of unidirectional voltages of opposite relative polarities, two voltage-sensitive impedance elements coupled to said modulator to affect the impedance balance thereof, and means for applying said unidirectional voltages one to each of said impedance elements to control the impedances thereof oppositely and in such a direction as to return the modulator substantially to its normally balanced condition.

8. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit and for developing therefrom a pair of unidirectional voltages of opposite relative polarities, the sense and magnitude of said voltages corresponding to the sense and degree of unbalance of said modulator, two voltage-sensitive impedance elements coupled to said modulator to affect the impedance balance thereof, and means for applying said unidirectional voltages one to each of said impedance elements to control the impedances thereof oppositely and in such a direction as to return the modulator substantially to its normally balanced condition.

9. A balanced modulator circuit comprising a rectifier modulator of the balanced shunt type, means for applying modulation frequency energy to said modulator, means for applying carrier frequency energy to said modulator, an output circuit coupled to said modulator, the arrangement being such that the impedances in said modulator are normally balanced with respect to said carrier frequency energy, means for isolating direct current components present in said output circuit and for developing therefrom a pair of unidirectional voltages of opposite relative polarities, means for differentially amplifying said voltages, two voltage-sensitive impedance elements coupled to said modulator to affect the impedance balance thereof, and means for applying the amplified unidirectional voltages one to each of said impedance elements to control the impedances thereof oppositely and in such a direction as to return the modulator substantially to its normally balanced condition.

References Cited in the file of this patent

UNITED STATES PATENTS

| | | |
|---|---|---|
| 1,794,847 | Green | Mar. 18, 1927 |
| 2,103,090 | Plebanski | Dec. 21, 1937 |
| 2,186,958 | Collins | Jan. 16, 1940 |
| 2,234,687 | Budenbom | Mar. 11, 1941 |
| 2,455,732 | Carter | Dec. 7, 1948 |
| 2,715,718 | Holtje | Aug. 16, 1955 |